United States Patent
Mori et al.

(10) Patent No.: US 10,688,753 B2
(45) Date of Patent: Jun. 23, 2020

(54) LAMINATED POLYARYLENE SULFIDE HEAT-RESISTANT FILTER

(71) Applicant: Toray Industries, Inc., Tokyo (JP)

(72) Inventors: Tatsuya Mori, Iyo-gun (JP); Takeshi Sugimoto, Iyo-gun (JP); Reo Mitsunaga, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 85 days.

(21) Appl. No.: 16/086,443

(22) PCT Filed: Mar. 13, 2017

(86) PCT No.: PCT/JP2017/009951
§ 371 (c)(1),
(2) Date: Sep. 19, 2018

(87) PCT Pub. No.: WO2017/169687
PCT Pub. Date: Oct. 5, 2017

(65) Prior Publication Data
US 2019/0099981 A1 Apr. 4, 2019

(30) Foreign Application Priority Data

Mar. 29, 2016 (JP) .................................. 2016-065136

(51) Int. Cl.
| | |
|---|---|
| *B32B 5/26* | (2006.01) |
| *D04H 1/4326* | (2012.01) |
| *D04H 1/4274* | (2012.01) |
| *B01D 39/16* | (2006.01) |
| *B32B 27/00* | (2006.01) |
| *B32B 5/02* | (2006.01) |
| *B32B 27/28* | (2006.01) |
| *C08L 81/02* | (2006.01) |
| *D04H 1/4374* | (2012.01) |

(52) U.S. Cl.
CPC .............. *B32B 5/26* (2013.01); *B01D 39/16* (2013.01); *B01D 39/1623* (2013.01); *B32B 5/024* (2013.01); *B32B 27/00* (2013.01); *B32B 27/286* (2013.01); *D04H 1/4326* (2013.01); *D04H 1/4374* (2013.01); *B32B 2305/188* (2013.01); *B32B 2307/306* (2013.01); *B32B 2307/54* (2013.01); *B32B 2307/724* (2013.01); *C08L 81/02* (2013.01)

(58) Field of Classification Search
CPC .............. B01D 38/16; B01D 38/1623; B01D 2239/064; B01D 2239/0654; B01D 2239/1233; B01D 2239/0457; B01D 2239/0613; B01D 39/16; B01D 39/1623; B32B 27/00; B32B 27/286; B32B 5/024; B32B 5/26; B32B 2307/306; B32B 2307/54; B32B 2305/188; D04H 1/4374; Y10T 442/02; Y10T 442/696; Y10T 442/3472
USPC .................................. 442/2, 414; 428/300.7
See application file for complete search history.

(56) References Cited

U.S. PATENT DOCUMENTS

2006/0172639 A1* 8/2006 Yamada ............. B01D 39/1623
442/59

FOREIGN PATENT DOCUMENTS

| CN | 1767882 A | 5/2006 |
|---|---|---|
| CN | 101168112 A | 4/2008 |
| CN | 101766933 A | 7/2010 |
| JP | 10-165729 A | 6/1998 |
| JP | 2010-264430 A | 11/2010 |
| JP | 2011-005860 A | 1/2011 |
| JP | 2014-152407 A | 8/2014 |
| JP | 2016-165666 A | 9/2016 |
| JP | 2016-203124 A | 12/2016 |

OTHER PUBLICATIONS

The First Office Action dated Mar. 30, 2020, of counterpart Chinese Application No. 201780019452.6, along with an English translation.

* cited by examiner

*Primary Examiner* — Camie S Thompson
(74) *Attorney, Agent, or Firm* — DLA Piper LLP (US)

(57) ABSTRACT

A laminated polyarylene sulfide heat-resistant filter has a plurality of layers, at least including a first web layer that is a filtering surface, and a second web layer that is a non-filtering surface, the laminated polyarylene sulfide heat-resistant filter being characterized in that the first web layer contains 30 to 70 wt % of polyarylene sulfide fibers having a fineness of 0.5 to 1.2 dtex, and 30 to 70 wt % of polyarylene sulfide fibers having a fineness of 1.3 to 3.0 dtex taking a total of a weight percentages of the first web layer as 100 wt %, wherein the second web layer contains polyarylene sulfide fibers having a fineness of 1.0 to 4.0 dtex.

16 Claims, No Drawings

LAMINATED POLYARYLENE SULFIDE HEAT-RESISTANT FILTER

TECHNICAL FIELD

This disclosure relates to a laminated polyarylene sulfide heat-resistant filter excellent in heat resistance, collecting properties, and the filter life without impairing productivity and, particularly, suitably used as a bag filter.

BACKGROUND

Filters used to clean air include filters for internal filtration and filters for surface filtration, and dust collectors use the filters for surface filtration. In surface filtration, dust is collected on the surface of a filter, to form a dust layer on the surface of the filter, and dust is successively collected by the dust layer. When the dust layer grows to a certain thickness, the dust layer is removed from the surface of the filter by air pressure, and the operation to form a dust layer on the surface of the filter is repeated again.

The fibers constituting the filters used to filter high temperature exhaust gases emitted from refuse incinerators, coal boilers, metal blast furnaces and the like include polyphenylene sulfide (hereinafter abbreviated as PPS) fibers, meta-aramid fibers, fluorine-based fibers, polyimide fibers and the like, respectively, excellent in heat resistance and chemical resistance, and they are formed into nonwoven fabrics to be used as filters. Among them, PPS fibers are excellent in hydrolytic resistance, acid resistance, and alkali resistance, and widely used as bag filters for dust collection of coal boilers.

For a bag filter, good dust release performance and dust collection performance are required as filter performance. When the dust release performance is inferior, a problem that the bag filter is clogged with dust occurs, which raises the pressure loss of the dust collector. In addition, a bag filter excellent in dust collection performance is required to reduce the dust concentration in exhaust gases.

JP 2010-264430 A proposes a filter cloth (filter) that has a two-layer structure of a dust collecting layer and a strength maintaining layer and uses a nonwoven fabric meltblown with PPS as the dust collecting layer. JP H10-165729 A proposes a filter cloth (filter) in which PPS fibers having a single fiber fineness of 1.8 d (2.0 dtex) or less are arranged in a surface layer. JP 2011-5860 A proposes a filter that has at least two layers of webs, in which the web on the air inflow surface side is made of heat resistant fibers having a fiber diameter of 15 μm or less, and the web on the air discharge surface side is made of heat resistant fibers having a fiber diameter of 20 μm or more.

Although the filter cloth (filter) of JP '430 certainly provides good dust release performance and dust collection performance, each step of needle punching, meltblowing, and water jet punching is necessary for production, and can be produced only by specific equipment. In addition to this, there has been a problem of high cost.

Although the method of JP '729 is certainly good in dust release performance and dust collection performance, it has insufficient stiffness and abrasion resistance at high temperatures, so there has been such a problem that the filter cloth (filter) is broken due to the progress of physical deterioration during use.

Although the method of JP '860 certainly makes stiffness and abrasion resistance of the filter good, since thick fiber diameter fibers on the air discharge surface side of the filter are entangled into the air inflow surface side, there has been a problem that sufficient dust release performance or dust collection performance cannot be obtained.

Accordingly, it could be helpful to provide a laminated polyarylene sulfide heat-resistant filter excellent in stiffness and abrasion resistance at high temperatures while having excellent dust release performance and dust collection performance inexpensively (at a low cost).

SUMMARY

The laminated polyarylene sulfide heat-resistant filter has a plurality of layers, at least including a first web layer that is a filtering surface, and a second web layer that is a non-filtering surface, characterized in that the first web layer contains 30 to 70 wt % of polyarylene sulfide fibers having a fineness of 0.5 to 1.2 dtex, and 30 to 70 wt % of polyarylene sulfide fibers having a fineness of 1.3 to 3.0 dtex taking a total of a weight percentages of the first web layer as 100 wt %, and characterized in that the second web layer contains polyarylene sulfide fibers having a fineness of 1.0 to 4.0 dtex.

Preferably, an average fineness $X_1$ of the fibers constituting the first web layer and an average fineness $X_2$ of the fibers constituting the second web layer satisfy formula (1):

$$X_1 < X_2 \tag{1}$$

It is thus possible to provide a laminated polyarylene sulfide heat-resistant filter inexpensively (at a low cost), the laminated polyarylene sulfide heat-resistant filter having excellent stiffness and abrasion resistance at high temperatures while having excellent dust release characteristics and dust collection characteristics.

DETAILED DESCRIPTION

Next, the laminated polyarylene sulfide heat-resistant filter (hereinafter sometimes simply referred to as the filter) will be described in detail.

The laminated polyarylene sulfide heat-resistant filter is a laminated polyarylene sulfide heat-resistant filter having a plurality of layers, at least including a first web layer that is a filtering surface, and a second web layer that is a non-filtering surface, in which the first web layer contains 30 to 70 wt % of polyarylene sulfide fibers having a fineness of 0.5 to 1.2 dtex, and 30 to 70 wt % of polyarylene sulfide fibers having a fineness of 1.3 to 3.0 dtex taking a total of a weight percentages of the first web layer as 100 wt %, and the second web layer contains polyarylene sulfide fibers having a fineness of 1.0 to 4.0 dtex.

The polyarylene sulfide fiber is a fiber in which 90% or more of its constituent units are polyarylene sulfide structural units. The polyarylene sulfide structural unit is a structural unit having a structure in which an aromatic ring and a sulfur atom are bonded as a repeating unit. It is possible to select a polymer by the structure of the aromatic ring. From the viewpoint of easy availability and spinnability, it is preferable to use a polyphenylene sulfide resin (PPS resin) in which bonding is at the para position of benzene.

Further, in the process of polymerization of the PPS resin, constituent units such as a meta-phenylene sulfide unit, a phenylene ether unit, a phenylene sulfone unit, a phenylene ketone unit, and a biphenylene ketone unit may be formed in the PPS resin in some cases. The PPS resin may contain these constituent units in an amount of 10% or less.

The laminated polyarylene sulfide heat-resistant filter has a multilayer structure at least including a first web layer which is a filtering surface and a second web layer which is a non-filtering surface, and both layers are composed of the polyarylene sulfide fibers.

It is important that the first web layer contains 30 to 70 wt % of polyarylene sulfide fibers having a fineness of 0.5 to 1.2 dtex and 30 to 70 wt % of polyarylene sulfide fibers having a fineness of 1.3 to 3.0 dtex taking the total of the weight percentages of the first web layer as 100 wt % and that the second web layer contains polyarylene sulfide fibers having a fineness of 1.0 to 4.0 dtex.

In the constitution of the first web layer, it is important to mix fine fineness fibers having a fineness of 0.5 to 1.2 dtex and thick fineness fibers having a fineness of 1.3 to 3.0 dtex in a predetermined range.

The fineness of the fine fineness fibers is 0.5 to 1.2 dtex. When the fineness of the fine fineness fibers is less than 0.5 dtex, the pressure loss of the filter tends to be high, the filter life tends to be shortened, and filter processability tends to be poor. The lower limit of the fineness of the fine fineness fibers is preferably 0.7 dtex, and is more preferably 0.8 dtex. When the fineness of the fine fineness fibers exceeds 1.2 dtex, the desired dust release performance or dust collection performance cannot be obtained. The upper limit of the fineness of the fine fineness fibers is preferably 1.1 dtex, and is more preferably 1.0 dtex.

The content of the fine fineness fibers is 30 to 70 wt % taking the total of the weight percentages of the first web layer as 100 wt %. When the content of the fine fineness fibers is less than 30 wt %, the desired dust release performance or dust collection performance cannot be obtained. The lower limit of the content of the fine fineness fibers is preferably 40% and is more preferably 45%. When the content of the fine fineness fibers exceeds 70 wt %, the pressure loss of the filter tends to be high, the filter life tends to be shortened, and filter processability tends to be poor. The upper limit of the content of the fine fineness fibers is preferably 60%, and is more preferably 55%.

The fineness of the thick fineness fibers is 1.3 to 3.0 dtex. When the fineness of the thick fineness fibers is less than 1.3 dtex, filter processability tends to be poor. The lower limit of the fineness of the thick fineness fibers is preferably 1.4 dtex, and is more preferably 1.5 dtex. When the fineness of the thick fineness fibers exceeds 3.0 dtex, the desired dust release performance or dust collection performance cannot be obtained. The upper limit of the fineness of the thick fineness fibers is preferably 2.8 dtex, and is more preferably 2.6 dtex.

The content of the thick fineness fibers is 30 to 70 wt % taking the total of the weight percentages of the first web layer as 100 wt %. When the content of the thick fineness fibers is less than 30 wt %, filter processability tends to be poor. The lower limit of the content of the thick fineness fibers is preferably 35 wt %, and is more preferably 40 wt %. When the content of the thick fineness fibers exceeds 70 wt %, the desired dust release performance or dust collection performance cannot be obtained. The upper limit of the content of the thick fineness fibers is preferably 60%, and is more preferably 55%.

In the first web layer, other fibers may be mixed as long as the desired performance is not impaired, but from the viewpoint of heat resistance, meta-aramid fibers, polyimide fibers and the like are preferable, and the content of other fibers is preferably 10% or less, and is more preferably 5% or less. Fluorine-based fibers are not preferable because incineration disposal becomes impossible when disposing the used filter.

In the second web layer, it is important that the second web layer contains polyarylene sulfide fibers having a fineness of 1.0 to 4.0 dtex.

The second web layer contains polyarylene sulfide fibers having a fineness of 1.0 to 4.0 dtex. When the fineness of the polyarylene sulfide fibers is less than 1.0 dtex, the pressure loss of the filter tends to be high, the filter life tends to be shortened, filter processability tends to be poor, and abrasion resistance tends to be poor. The lower limit of the fineness of the polyarylene sulfide fibers is preferably 1.2 dtex, and is more preferably 1.4 dtex. When the fineness of the polyarylene sulfide exceeds 4.0 dtex, the desired dust release performance or dust collection performance cannot be obtained. The upper limit of the fineness of the polyarylene sulfide is preferably 3.3 dtex and is more preferably 2.8 dtex.

When the fineness of the polyarylene sulfide fibers in the second web layer is in the range, fibers having a single fineness or a mixture of fibers having different finenesses may be used. In the second web layer, other fibers may be mixed as long as the desired effects are not impaired, but from the viewpoint of heat resistance, meta-aramid fibers, polyimide fibers and the like are preferable, and the content of other fibers is preferably 10% or less, and is more preferably 5% or less. Fluorine-based fibers are not preferable because incineration disposal becomes impossible when disposing the used filter.

With regard to the fineness constituting the second web layer, it is preferable that the average fineness $X_1$ of the fibers constituting the first web layer and the average fineness $X_2$ of the fibers constituting the second web layer satisfy formula (1). That is, it is preferable that the average fineness $X_2$ of the second web layer exceeds the average fineness $X_1$ of the first web layer. When the average fineness $X_2$ is less than the average fineness $X_1$, the desired dust release performance or dust collection performance may not be obtained in some cases, and it is not preferable from the viewpoint of strength and abrasion resistance of the filter $$X_1 \leq X_2 \quad (1).$$

It is preferable that the laminated polyarylene sulfide heat-resistant filter includes a support layer between the first web layer and the second web layer from the viewpoint of the filter strength.

The support layer is preferably a fabric using polyarylene sulfide fibers.

From the viewpoint of the strength of the obtained heat-resistant filter, it is preferable that the support layer has an MD strength (strength in longitudinal direction) of 1,000 N/5 cm or more and a CD strength (strength in weft direction) of 500 N/5 cm or more. A more preferable range of the MD strength of the support layer is 1,050 N/5 cm or more, and an even more preferable range of the MD strength of the support layer is 1,100 N/5 cm or more. A more preferable lower limit of the CD strength of the support layer is 550 N/5 cm, and an even more preferable lower limit of the CD strength of the support layer is 600 cN/5 cm.

As a form of the polyarylene sulfide fibers used for the support layer, it is desirable to use short staple spun yarns or multifilaments. Particularly, short staple spun yarns are suitably used for such reasons that they can be well entangled with the web, and that since the fibers have a large surface area, the dust-collecting efficiency of the filter is good. The fineness of the fibers constituting the support layer is not particularly limited. However, it is not preferred that the fineness is too large, since the meshes of the support layer tend to be closed depending on weaving conditions, to raise the pressure loss. It is not preferred either that the fineness is too small since the strength of the support layer tends to decline to lower the mechanical strength of the filter as a whole, though the weaving density tends to decline to raise the air permeation amount.

The total fineness of the fibers constituting the support layer is preferably 100 to 1,000 dtex, and is more preferably 300 to 600 dtex. When the total fineness is less than 100 dtex, the effect of enhancing the dimensional stability and tensile strength may not be sufficiently obtained in some cases. On the other hand, when the total fineness exceeds 1,000 dtex, although the dimensional stability and the tensile strength are excellent, the air permeation amount of the filter tends to decrease and, therefore, there is a possibility that the life of a filter is shortened.

The form of the support layer is preferably a coarsely meshed woven fabric from the viewpoint of reducing the pressure loss when being used as a filter. As for the weaving density, the warp density is preferably 20 to 50 threads/2.54 cm, and is more preferably 25 to 40 threads/2.54 cm, and the weft density is preferably 10 to 30 threads/2.54 cm, and is more preferably 10 to 25 threads/2.54 cm. Examples of the weaving structure of the support layer include plain weave, double weave, triple weave, twill weave, satin weave, and the like. Particularly, a woven fabric with a general purpose plain weave available at a low cost can be preferably used since a filter with satisfactory performance can be obtained.

With regard to a method of producing the laminated polyarylene sulfide heat-resistant filter, for example, as the first web layer, a web containing 30 to 70 wt % of polyarylene sulfide fibers having a fineness of 0.5 to 1.2 dtex and 30 to 70 wt % of polyarylene sulfide fibers having a fineness of 1.3 to 3.0 dtex taking the total of the weight percentages of the first web layer as 100 wt % is prepared. Then, the first web layer is laminated with the support layer and, thereafter, a web containing polyarylene sulfide fibers having a fineness of 1.0 to 4.0 dtex is prepared as the second web layer, and the second web layer is further laminated with the laminate of the first web layer and the support layer. After that, they are entangled for integration. Such a method can be suitably used.

As a method of preparing a web, for example, a method of passing staple fibers of heat resistant fibers through a carding machine to form a web can be suitably used. Further, as a method of entangling for integration of the webs, needle punching or water jet punching is preferred.

It is preferable that the laminated polyarylene sulfide heat-resistant filter has a thickness of 1.5 to 2.5 mm. When the thickness exceeds this range, it may be difficult to obtain a preferable apparent density, weight per unit area or the like, in some cases. A more preferable range of the thickness is 1.6 to 2.3 mm, and an even more preferable range is 1.7 to 2.2 mm.

It is preferable that the air permeability of the laminated polyarylene sulfide heat-resistant filter when ventilated at a static pressure of 125 kPa is 5 cc/cm$^2$/s or more. When the air permeability is less than 5 cc/cm$^2$/s, the pressure loss increases when the filter is used, which may shorten the life of the filter in some cases. The air permeability is preferably 6 cc/cm$^2$/s or more, preferably 7 cc/cm$^2$/s or more.

It is preferable that the laminated polyarylene sulfide heat-resistant filter has an apparent density of 0.20 to 0.40 g/cm$^3$. When the apparent density is less than 0.20, air gaps among the fibers in the filter tend to become too large, and dust tends to penetrate into the filter, possibly shortening the filter life. The lower limit of the apparent density is more preferably 0.22 g/cm$^3$, even more preferably 0.24 g/cm$^3$. When the apparent density exceeds 0.40, air gaps among the fibers in the filter tend to disappear, and there is a possibility that the life is shortened because the pressure loss increases. The upper limit of the apparent density is more preferably 0.38 g/cm$^3$, even more preferably 0.36 g/cm$^3$.

The apparent density of the laminated polyarylene sulfide heat-resistant filter can be adjusted appropriately by those skilled in the art by selecting production conditions of the filter. Examples of the production conditions include the weight per unit area of the filter, the needling number and the needle number in the case of needle punching, the pressure of water jet and the nozzle diameter in the case of water jet punching, as well as the calendering pressure and the number of times in the case when calendering processing is applied.

The weight per unit area of the laminated polyarylene sulfide heat-resistant filter is not particularly limited as long as the weight per unit area enables to satisfy the above characteristics, but the weight per unit area is preferably 400 to 800 g/m$^2$, more preferably 500 to 700 g/m$^2$. When the weight per unit area of the filter is less than 400 g/m$^2$, the strength of the filter tends to be low. When the weight per unit area of the filter exceeds 800 g/m$^2$, the pressure loss of the filter tends to be high, and the filter may not be suitable for use in some cases.

The weight per unit area of the heat-resistant filter can be adjusted mainly by the quantity of the raw fibers fed with respect to the line speed of the filter processing machine as well as the number of webs overlapped. Those skilled in the art can adjust appropriately by considering other filter processing conditions.

The laminated polyarylene sulfide heat-resistant filter can further enhance the dust release performance and the dust-collecting efficiency by partially fusing the web surface on the first web layer side where dust is deposited. As the method of partially fusing the web surface, such a method as singeing treatment or mirror processing can be used. Specifically, singeing treatment is applied to the first web layer of the heat-resistant filter by a burner flame, infrared heater or the like, or a hot roll is used to press the first web layer. Such a treatment causes the web surface of the first web layer to be at least partially fused or to have its meshes closed, to enhance the dust-collecting efficiency.

The laminated polyarylene sulfide heat-resistant filter thus obtained is sewn into a bag, and suitably used as a bag filter in need of heat resistance, to collect dust in the exhaust gases of refuse incinerators, coal boilers, metal blast furnaces and the like. It is preferred that the sewing threads used for the sewing are yarns composed of fiber materials having heat resistance and chemical resistance, and among them, polyarylene sulfide fibers are preferably used.

EXAMPLES

Our filters are explained hereinafter in more detail with reference to examples, but this disclosure is not limited thereto.

The methods of measuring the respective physical properties of the laminated polyarylene sulfide heat-resistant filters are as follows.

Weight Per Unit Area (g/m$^2$)

Three samples of 20 cm×20 cm were prepared and the weight of each samples was measured by the method of JIS-L 1085 (1998), and the average value thereof was obtained as the mass per m$^2$.

Thickness (mm)

Ten test pieces of 10 cm×10 cm were taken from the sample and a pressure of 0.5 kPa was applied to the upper circular horizontal plate of a thickness measuring instrument (a textile compressive elasticity tester manufactured by MAEDA PRECISION MFG. LTD.) over 10 seconds to measure the thickness according to the method of JIS-L 1913 (2010), and the average value of 10 test pieces was calculated.
Apparent Density (g/cm$^3$)
The apparent density was calculated from the above-described weight per unit area and thickness.
Strength (N/5 cm) and Elongation (%)
With regard to each of the support layer and the filter, each of the strength and elongation was calculated in the MD direction and CD direction as the average value of test pieces of 5 samples by a constant rate of extension type tensile testing machine according to the method of JIS-L 1085 (1998).
Air Permeability (cc/cm$^2$/s)
The air permeation amount was measured at 10 places selected at random by being ventilated at a static pressure of 125 kPa according to JIS-L 1096 (2010) Method A (Frazier form method), and the air permeability was calculated as the average value thereof.
Outlet Dust Concentration (mg/m$^3$), and Circulation Time (s)
Using the equipment specified in VDI-3926 Part I, the dust collection performance test was carried out according to the measurement conditions specified in JIS Z 8909-1 (2005). Representative numerical values were as follows:
Dust: the test powder No. 10 specified in JIS Z 8901 (2005)
Inlet dust concentration: 5 g/m$^3$
Filtering speed: 2 m/min
Compression air tank pressure for pulsing (500 kPa)
Shaking off pressure loss: 1000 Pa
Pulse injection time: 50 ms.
The aging treatment of the filter cloth was performed according to the method specified in 7.2 of JIS Z 8901-1 (2005), and then the filter cloth to which the aging and stabilization treatment was performed was subjected to shaking off operation 30 times, and from the air permeation amount and the amount of dust which passed through the filter during the shaking off operation, the outlet dust concentration was calculated. In addition, the cumulative time of the dust ventilating time during 30 times of the above-described shaking off operation was taken as the circulation time.
Filter Processability
The process passing property when being processed into the filter was judged as follows:
S: Processable at a predetermined line speed, and there is no unevenness in the fabric uniformity.
A: Processable at a predetermined line speed. Some unevenness in the fabric uniformity is seen, but the filter performance is not affected.
B: There is a lot of unevenness in the fabric uniformity and it is not processable unless the line speed is reduced.

Example 1

PPS staple fibers with a fineness of 2.2 dtex and a cut length of 51 mm ("TORCON (R)" 5391-2.2T51 mm, produced by TORAY INDUSTRIES, INC.) were used to obtain a spun yarn having a single yarn count of 20 s obtained by doubling two yarns (hereinafter referred to as 20 s/2) and a spun yarn having a single yarn count of 7 s (hereinafter referred to as 7 s/1). A PPS spun yarn plain weave fabric having a warp density of 30 threads/2.54/cm and a weft density of 18 threads/2.54 cm was obtained by plain weaving with 20 s/2 as a warp and 7 s/1 as a weft among these spun yarns. The obtained woven fabric had an MD strength of 1,330 N/5 cm, a CD strength of 620 N/5 cm, and a weight per unit area of 132 g/m$^2$. The woven fabric was used as a support layer.

PPS staple fibers with a fineness of 1.0 dtex and a cut length of 51 mm ("TORCON (R)" 5301-1T51 mm, produced by TORAY INDUSTRIES, INC.) and PPS staple fibers with a fineness of 2.2 dtex and a cut length of 51 mm ("TORCON (R)" 5371-2.2T51 mm, produced by TORAY INDUSTRIES, INC.) were blended at a ratio by weight of 50:50, and the blended staple fibers were treated using an opener and a carding machine, and then the weight per unit area was made to be about 220 g/m$^2$ with a cross lapping machine to prepare a web. The web was laminated on one surface of the above-described support layer and, thereafter, they were temporarily needle-punched at a needling density of 100 needles/cm$^2$. The web layer formed the first web layer that is the filtering surface.

On the other surface of the support layer with which the above-described web was laminated, 100% of PPS staple fibers with a fineness of 2.2 dtex and a cut length of 51 mm ("TORCON (R)" S371-2.2T51 mm, produced by TORAY INDUSTRIES, INC.) which were the same as those used for the first web layer were treated using an opener and a carding machine and, then, the weight per unit area was made to be about 220 g/m$^2$ with a cross lapping machine to prepare a web. The web was laminated on the other surface of the support layer with which the above-described web had been laminated and, thereafter, they were temporarily needle-punched at a needling density of 100 needles/cm$^2$. The web layer formed the second web layer that is the non-filtering surface.

Furthermore, the laminate was needle-punched to entangle the support layer, the above-described first web layer, and the second web layer, to obtain a filter with a weight per unit area of 552 g/m$^2$ and a total needling density of 500 needles/cm$^2$. The performance of the obtained filter is shown in Table 1.

Example 2

In the same manner as in Example 1 except that PPS staple fibers having a fineness of 2.2 dtex and a cut length of 51 mm used for the first web layer and the second web layer were changed to PPS staple fibers having a fineness of 1.5 dtex and a cut length of 51 mm, a filter with a weight per unit area of 552 g/m$^2$ was obtained. The performance of the obtained filter is shown in Table 1.

Example 3

In the same manner as in Example 2 except that PPS staple fibers having a fineness of 1.0 dtex and a cut length of 51 mm used for the first web layer were changed to PPS staple fibers having a fineness of 0.8 dtex and a cut length of 51 mm, a filter with a weight per unit area of 556 g/m$^2$ was obtained. The performance of the obtained filter is shown in Table 1.

Comparative Example 1

In the same manner as in Example 1 except that all PPS fibers used for the first web layer and the second web layer were changed to PPS fibers having a fineness of 1.0 dtex and a cut length of 51 mm, a filter with a weight per unit area of 554 g/m$^2$ was obtained. However, as many neps occurred during the carding process, it was necessary to lower the line speed by about 40%. The performance of the obtained filter is shown in Table 1.

Comparative Example 2

In the same manner as in Example 1 except that all PPS fibers used for the first web layer and the second web layer were changed to PPS fibers having a fineness of 2.2 dtex and a cut length of 51 mm, a filter with a weight per unit area of 566 g/m² was obtained. The performance of the obtained filter is shown in Table 1.

Comparative Example 3

In the same manner as in Example 1 except that PPS fibers used for the second web layer were changed to PPS staple fibers having a fineness of 7.8 dtex and a cut length of 51 mm ("TORCON (R)" S101-7.8T51 mm, produced by TORAY INDUSTRIES, INC.), a filter with a weight per unit area of 575 g/m² was obtained. The performance of the obtained filter is shown in Table 1.

a fineness of 7.8 dtex, the outlet dust concentration was high and the desired dust collection performance could not be obtained. We believe that this is due to entanglement of the thick fineness fibers of the second web layer into the first web layer.

The invention claimed is:

1. A laminated polyarylene sulfide heat-resistant filter comprising a plurality of layers, at least including a first web layer that is a filtering surface, and a second web layer that is a non-filtering surface, wherein
   the first web layer consists of 30 to 70 wt % of polyarylene sulfide fibers having a fineness of 0.5 to 1.2 dtex, and 30 to 70 wt % of polyarylene sulfide fibers having a fineness of 1.3 to 3.0 dtex, based on a total of a weight percentages of the first web layer as 100 wt %, and
   the second web layer consists of polyarylene sulfide fibers having a fineness of 1.0 to 4.0 dtex.

2. The laminated polyarylene sulfide heat-resistant filter according to claim 1, wherein an average fineness $X_1$ of the fibers constituting the first web layer and an average fineness $X_2$ of the fibers constituting the second web layer satisfy formula (1):

$$X_1 < X_2 \qquad (1).$$

TABLE 1

|  |  |  | Example 1 | Example 2 | Example 3 | Comparative Example 1 | Comparative Example 2 | Comparative Example 3 |
|---|---|---|---|---|---|---|---|---|
| Filter constitution | First web layer (Filtering surface) | 0.8 dtex | | | | 50% | | |
| | | 1.0 dtex | 50% | 50% | | 100% | | 50% |
| | | 1.5 dtex | | 50% | 50% | | | |
| | | 2.2 dtex | 50% | | | | 100% | 50% |
| | | Average fineness $X_1$ | 1.6 dtex | 1.25 dtex | 1.15 dtex | 1.0 dtex | 2.2 dtex | 1.6 dtex |
| | Support layer | | | | PPS spun yarn plain weave fabric | | | |
| | Second web layer (Non-filtering surface) | 1.0 dtex | | | | 100% | | |
| | | 1.5 dtex | | 100% | 100% | | | |
| | | 2.2 dtex | 100% | | | | 100% | |
| | | 7.8 dtex | | | | | | 100% |
| | | Average fineness $X_2$ | 2.2 dtex | 1.5 dtex | 1.5 dtex | 1.0 dtex | 2.2 dtex | 7.8 dtex |
| Filter processability | B or A or S | | S | A | A | B | S | S |
| Filter physical properties | Thickness | mm | 1.8 | 1.8 | 1.8 | 1.9 | 1.7 | 2.0 |
| | Weight per unit area | g/m² | 552 | 552 | 556 | 569 | 566 | 575 |
| | Apparent density | g/cm³ | 0.31 | 0.31 | 0.31 | 0.30 | 0.33 | 0.29 |
| | Air permeability | cc/cm²/s | 12.6 | 11.8 | 10.7 | 10.0 | 13.1 | 15.3 |
| | Strength MD direction | N/5 cm | 1180 | 1200 | 1200 | 1210 | 1170 | 1250 |
| | CD direction | N/5 cm | 1950 | 1790 | 1820 | 1590 | 2000 | 1560 |
| | Elongation MD direction | % | 33 | 30 | 32 | 30 | 28 | 28 |
| | CD direction | % | 29 | 33 | 30 | 33 | 28 | 23 |
| Filter performance | Outlet dust concentration | mg/m³ | 0.25 | 0.15 | 0.12 | 0.11 | 0.73 | 0.56 |
| | Circulation time | s | 9200 | 8500 | 8200 | 6500 | 9900 | 9200 |

It was indicated that the filters obtained in Examples 1 to 3 were good in the filter processability and excellent in the outlet dust concentration as an index of the dust collection performance and the circulation time as an index of the filter life.

It was indicated that since the filter obtained in Comparative Example 1 used only fine fineness fibers, the filter processability was poor. In addition, it was indicated that even though the outlet dust concentration serving as an index of the dust collection performance was good as the filter performance, the circulation time serving as an index of the filter life was shortened.

With regard to the filter obtained in Comparative Example 2, since the first web layer only used thick fineness fibers, the outlet dust concentration was high and the desired dust collection performance could not be obtained.

With regard to the filter obtained in Comparative Example 3, since the second web layer used thick fineness fibers with 3. The laminated polyarylene sulfide heat-resistant filter according to claim 2, further comprising a support layer between the first web layer and the second web layer.

4. The laminated polyarylene sulfide heat-resistant filter according to claim 3, wherein the support layer is a polyarylene sulfide spun yarn woven fabric having an MD strength of 1000 N/5 cm or more and a CD strength of 500 N/5 cm or more.

5. The laminated polyarylene sulfide heat-resistant filter according to claim 2, wherein the laminated polyarylene sulfide heat-resistant filter has a thickness of 1.5 to 2.5 mm, and the laminated polyarylene sulfide heat-resistant filter has an apparent density of the entirety of 0.20 to 0.40 g/cm³.

6. The laminated polyarylene sulfide heat-resistant filter according to claim 2, wherein an air permeability when ventilated at a static pressure of 125 kPa is 5 cc/cm²/sec or more.

7. The laminated polyarylene sulfide heat-resistant filter according to claim 1, further comprising a support layer between the first web layer and the second web layer.

8. The laminated polyarylene sulfide heat-resistant filter according to claim 7, wherein the support layer is a polyarylene sulfide spun yarn woven fabric having an MD strength of 1000 N/5 cm or more and a CD strength of 500 N/5 cm or more.

9. The laminated polyarylene sulfide heat-resistant filter according to claim 8, wherein the laminated polyarylene sulfide heat-resistant filter has a thickness of 1.5 to 2.5 mm, and the laminated polyarylene sulfide heat-resistant filter has an apparent density of the entirety of 0.20 to 0.40 g/cm$^3$.

10. The laminated polyarylene sulfide heat-resistant filter according to claim 8, wherein an air permeability when ventilated at a static pressure of 125 kPa is 5 cc/cm$^2$/sec or more.

11. The laminated polyarylene sulfide heat-resistant filter according to claim 7, wherein the laminated polyarylene sulfide heat-resistant filter has a thickness of 1.5 to 2.5 mm, and the laminated polyarylene sulfide heat-resistant filter has an apparent density of the entirety of 0.20 to 0.40 g/cm$^3$.

12. The laminated polyarylene sulfide heat-resistant filter according to claim 7, wherein an air permeability when ventilated at a static pressure of 125 kPa is 5 cc/cm$^2$/sec or more.

13. The laminated polyarylene sulfide heat-resistant filter according to claim 1, wherein the laminated polyarylene sulfide heat-resistant filter has a thickness of 1.5 to 2.5 mm, and the laminated polyarylene sulfide heat-resistant filter has an apparent density of the entirety of 0.20 to 0.40 g/cm$^3$.

14. The laminated polyarylene sulfide heat-resistant filter according to claim 13, wherein an air permeability when ventilated at a static pressure of 125 kPa is 5 cc/cm$^2$/sec or more.

15. The laminated polyarylene sulfide heat-resistant filter according to claim 1, wherein an air permeability when ventilated at a static pressure of 125 kPa is 5 cc/cm$^2$/sec or more.

16. The laminated polyarylene sulfide heat-resistant filter according to claim 1, wherein an air permeability when ventilated at a static pressure of 125 kPa is 5 to 12.6 cc/cm$^2$/sec.

* * * * *